United States Patent [19]

Sugano et al.

[11] Patent Number: 5,099,695
[45] Date of Patent: Mar. 31, 1992

[54] PRESSURE DETECTION APPARATUS

[75] Inventors: Shigeru Sugano; Nobuo Makishima, both of Sohka, Japan

[73] Assignee: SMC Corporation, Tokyo, Japan

[21] Appl. No.: 512,445

[22] Filed: Apr. 23, 1990

[51] Int. Cl.$^5$ .................... G01L 9/06; G01L 19/04
[52] U.S. Cl. .................................... 73/708; 73/721; 73/727; 73/754; 338/4
[58] Field of Search .... 73/708, 706, 721, 727;DIG. 4, 73/754; 338/4

[56] References Cited

U.S. PATENT DOCUMENTS

| | | | |
|---|---|---|---|
| 4,480,478 | 11/1984 | Sato et al. | 73/708 |
| 4,800,759 | 1/1989 | Hirata et al. | 73/721 |

FOREIGN PATENT DOCUMENTS

| | | | |
|---|---|---|---|
| 62-9106 | 1/1987 | Japan . | |
| 0185137 | 8/1987 | Japan | 73/720 |

Primary Examiner—Donald O. Woodiel
Attorney, Agent, or Firm—Oblon, Spivak, McClelland, Maier & Neustadt

[57] ABSTRACT

A pressure detection apparatus is provided with a semiconductor pressure sensor interposed between a reference pressure side and a measured pressure side and adapted to detect pressure in fluid corresponding to the difference between the reference pressure and the measured pressure. In addition, the apparatus is connected to an output side of the semiconductor pressure sensor and also includes a sensor offset compensation circuit for adjusting an output value from the semiconductor pressure sensor at a predetermined temperature to provide zero-point temperature compensation, thereby making it possible to compensate for an offset value of the semiconductor pressure sensor. This apparatus is not affected by the external atmospheric temperature, thus enabling it to provide fully stable operation.

5 Claims, 3 Drawing Sheets

PRESSURE DETECTION APPARATUS

BACKGROUND OF THE INVENTION

1. Field of the Invention

The present invention relates to a pressure detection apparatus, and more specifically to a pressure detection apparatus of a type wherein a semiconductor pressure sensor is interposed between the side of reference pressure of fluid, preferably, pressurized air, and the side of measured pressure thereof so as to obtain the difference between the pressure on the side of the reference pressure and that on the side of the measured pressure by driving the semiconductor pressure sensor at a constant voltage, and an offset value of an output fed from the semiconductor pressure sensor and varying with the external atmospheric temperature, is corrected under predetermined temperature, thereby enabling a feed system which makes use of pressure in fluid or the like to be easily and positively controlled.

Heretofore, feed apparatus which make use of air pressure have widely been employed in manufacturing factories or the like. This is because, for example, the apparatus is relatively risk free, is low in manufacturing costs, and is simple to maintain and control.

This type of feed apparatus is designed, for example, to use a suction pad, which is in turn connected to a vacuum source, so as to adsorb a work under action of negative pressure of the suction pad for feeding the same. At this time, if the negative pressure does not reach a predetermined value, the work cannot be adsorbed and carried at all. In addition, there is a potential problem that such apparatus may be damaged accidentally, such as by the work falling, if the vacuum level of the work is not kept at all times in a predetermined region. Therefore, a pressure detection mechanism has conventionally been incorporated into this type of apparatus. The prior art which is suitable for this type of mechanism, has been disclosed in, for example, Japanese Utility Model Application Laid-Open No. 62-9106. In other words, a pressure detection element, which makes use of piezoresistance effects and is driven by the current, is interposed between a pressure passage for comparison and a pressure passage for measurement. When a constant current is supplied to the pressure detection element, the comparison circuit serves to compare an analog signal produced corresponding to the difference in pressure referred to above with a separately established comparison reference voltage for generating an on or off two-position signal, thereby to convert the two-position signal into a control signal as control output by means of an output circuit. In other words, a comparison is made between an output voltage from the pressure detection element and the comparison reference voltage to obtain a control output.

Meanwhile, the semiconductor pressure sensor, which makes use of the piezoresistance effects, is superior to other capacitance type pressure sensors, metallic gauge type pressure sensors or mechanical pressure sensors in that the semiconductor pressure sensor can be fabricated at low cost, be mass-produced and has consistent sample-to-sample performance. However, on the other hand, the semiconductor pressure sensor will reveal the drawback that it is strongly dependent on temperature. Especially, when it is desired to perform a current drive of the semiconductor pressure sensor, the semiconductor pressure sensor making use of the piezoresistance effects shows a particularly dependency on temperature. As a result, where it is desired to incorporate this type of semiconductor pressure sensor into the pressure detection apparatus which has already been disclosed in Japanese Utility Model Application Laid-Open No. 62-9106, the difference between the comparison voltage and the measured voltage cannot be obtained in a stable state owing to the external atmospheric temperature. As a consequence, there exists a potential problem that the control output always remains unstable. Accordingly, where this type of pressure detection apparatus is employed in the feed system or the like, the control of the vacuum source must be performed more accurately. In addition, inconvenience such as complication of the construction of the control circuit takes place because of the constant-current drive.

SUMMARY OF THE INVENTION

It is a principal object of the present invention to provide a pressure detection apparatus for detecting air pressure in order to perform the feeding of work or the like using principally the air pressure, the improvement wherein a constant-voltage driven semiconductor pressure sensor is incorporated therein, thereby to operate stably regardless of the external atmospheric temperature.

Another object of the present invention is to provide a pressure detection apparatus comprising at least one semiconductor pressure sensor interposed between a reference pressure side and a measured pressure side and for detecting pressure in fluid corresponding to the difference between the reference pressure and the measured pressure, and a constant-voltage drive circuit for driving said semiconductor pressure sensor at a constant voltage.

A further object of the present invention is to provide a pressure detection apparatus, further connected to an output side of the semiconductor pressure sensor and including a sensor offset compensation circuit for performing zero-point adjustment of an output value from the semiconductor pressure sensor at a predetermined temperature.

A still further object of the present invention is to provide a pressure detection apparatus, further connected to an output side of the sensor offset compensation circuit and including a comparison amplifier for amplifying an output signal assuming the positive or negative polarity from the sensor offset compensation circuit and an output circuit connected to an output side of the comparison amplifier and for producing an on or off control output depending on the positive or negative polarity of the output signal from the comparison amplifier.

A still further object of the present invention is to provide a pressure detection apparatus wherein the pressurized fluid is air.

The above and other objects, features and advantages of the present invention will become apparent from the following description and the appended claims, taken in conjunction with the accompanying drawings in which a preferred embodiment of the present invention is shown by way of illustrated example.

DETAILED DESCRIPTION OF THE PREFERRED EMBODIMENTS

Figure 1:
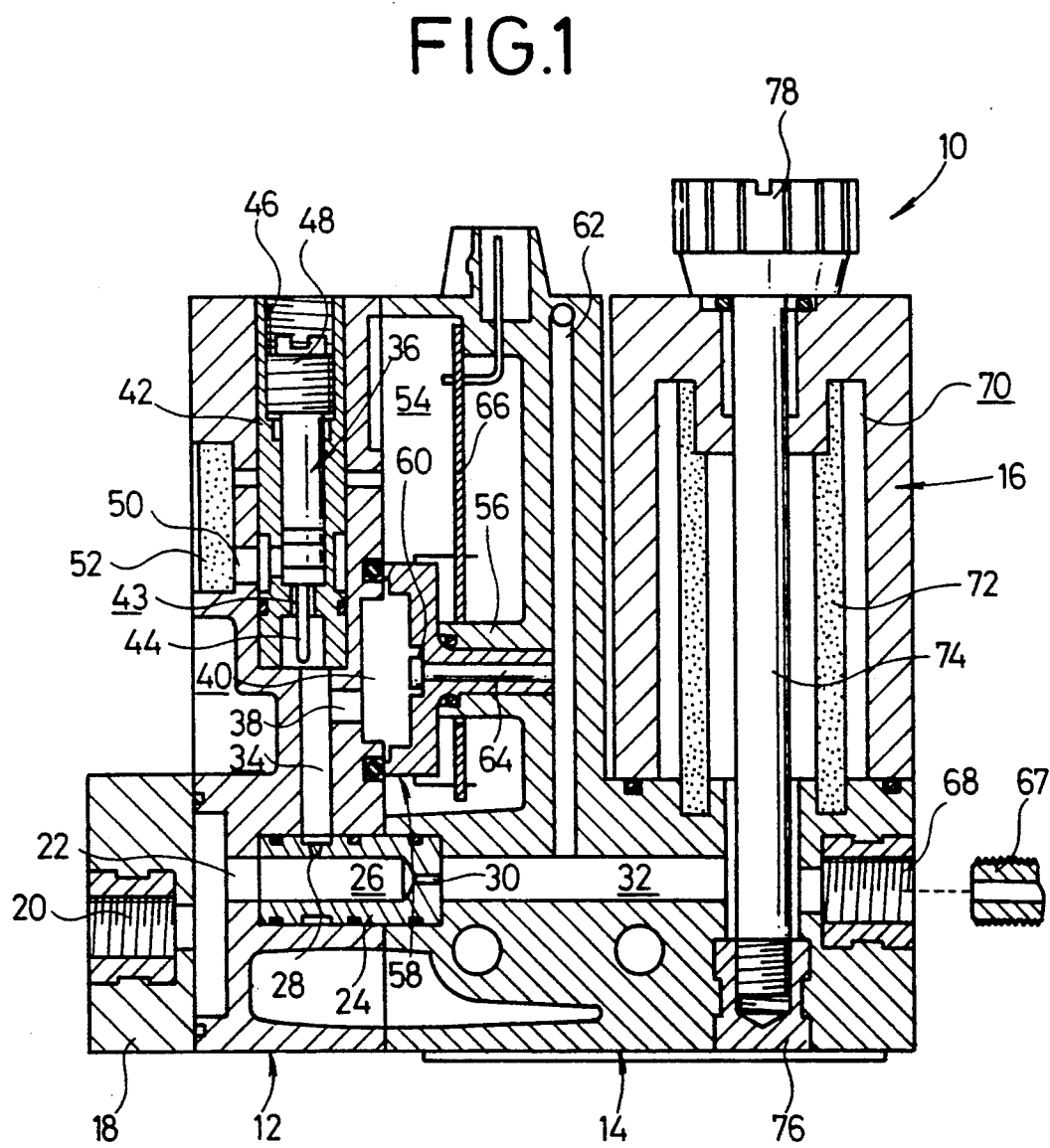
FIG. 1 is a longitudinal cross-sectional view of a pressure detection apparatus according to one embodiment of this invention.

A preferred embodiment of this invention will hereinafter be described with reference to FIG. 1. In the same drawing, designated at numeral 10 is a pressure detection apparatus according to this invention. This pressure detection apparatus 10 includes a first block 12, a second block 14 and a third block 16. An adapter 18 is securely fixed to the first block 12 and provided with an inlet 20 for introducing pressurized air therein. The inlet 20 defined in the adapter 18 is in communication with a nozzle 24 through a passage 22 defined in the first block 12. The nozzle 24 is actually provided with a chamber 26 which is communicated to the passage 22; and a first orifice 28 and a second orifice 30 are defined in the nozzle 24 such that they communicate with the chamber 26. As is easily seen from FIG. 1, the nozzle 24 is fitted in a recess defined in the second block 14 and is in communication with a passage 32 formed in the second block 14.

Referring to FIG. 1, a passage 34, which extends upwardly in a vertical direction, is defined in the first block 12. This passage 34 faces a needle valve 36 and further branches off to define a passage 38. The passage 38 communicates with a pressure chamber 40 formed between the first block 12 and the second block 14.

The needle valve 36 includes a needle guide 42 and a needle 44, which in turn moves forward and backward freely by rotating a screw 48 in a screw hole 46 which opens upwards in FIG. 1 spirally about an axis. The passage 34 actually communicates with a passage 50 through a gap 43 defined between the needle 44 and the needle guide 42. The passage 50 and a filter 52 face each other.

On the other hand, the second block 14 includes a chamber 54 and an expansion 56 is formed so as to be projected toward the chamber 54. A pressure detection mechanism 58 is fitted in and mounted on its corresponding bore defined so as to extend in the direction of the axis of the expansion 56, using the expansion 56. The pressure detection mechanism 58 includes a semiconductor pressure sensor 60 which faces the pressure chamber 40 one end of which is in communication with a passage 62 which extends as a branch path from the passage 32 by way of a conduit 64. The pressure detection mechanism 58 further holds a substrate assembly 66 within the chamber 54. Incorporated into the substrate assembly 66 is an electric circuit which serves to convert the difference in pressure between reference pressure as air pressure to be detected by the semiconductor pressure sensor 60 and comparison pressure into an electric signal, or the like.

The passage 32 defined in the second block 14 further communicates with an outlet 68 with which a detection nozzle 67 is brought into engagement. At this time, the passage 32 branches off to communicate with a chamber 70 defined inside the third block 16. A filter 72 is provided inside the chamber 70 and a rod 74 extends through the central portion of the filter 72. A tip portion of the rod 74 is threaded into a male screw 76 inserted into and fitted in the second block 14. In other words, the rod 74 constitutes a tension bolt. Then, the rod 74 is pulled upwards as viewed in FIG. 1 by rotating a thumb nut 78, thereby to form the second block 14 and the third block 16 as an integral unit. Although not shown, the chamber 70 is in communication with an exterior part.

Figure 2:
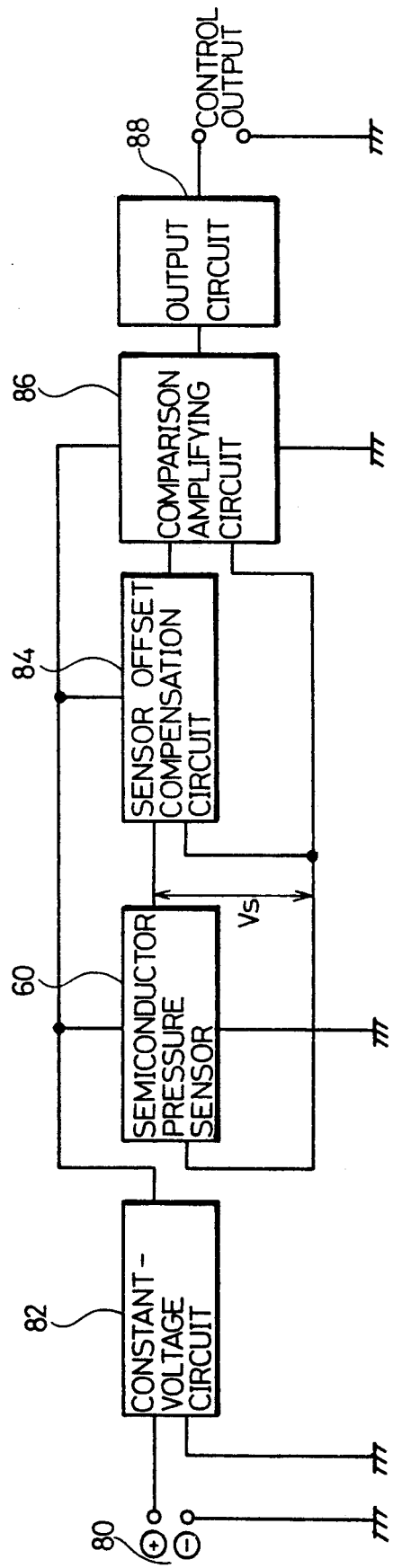
FIG. 2 is a block diagram of a semiconductor pressure sensor and a drive circuit for the semiconductor pressure sensor, which are to be incorporated into the pressure detection apparatus according to this invention.
Figure 3:
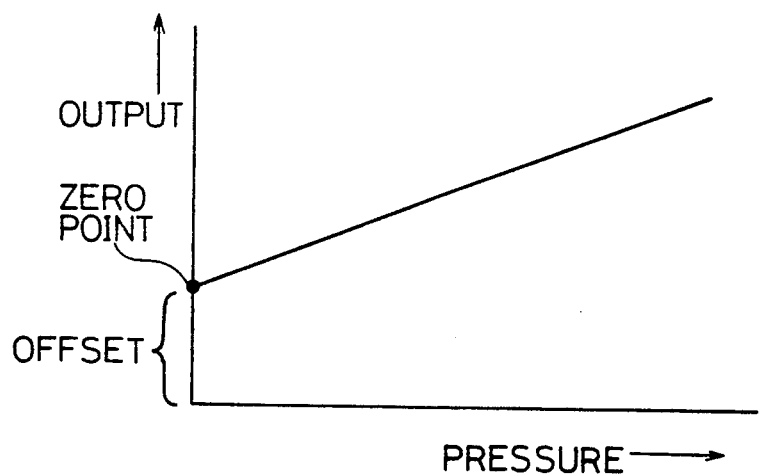
FIG. 3 is a graph for describing the relation between an output and an offset value both related to the deviation of a semiconductor pressure sensor, and a control output.

FIG. 2 is a block diagram of an electric circuit which constitutes the pressure detection apparatus 10. In other words, a power supply 80 is connected to a constant-voltage circuit 82 to ensure constant voltage from the power supply 80. An output voltage from the constant-voltage circuit 82 is applied to the semiconductor, pressure sensor 60. As has already been known, the semiconductor pressure sensor 60 actually constitutes a bridge circuit and hence an output voltage $V_S$ can be obtained from the semiconductor pressure sensor 60. The output voltage $V_S$ from the sensor 60 is applied to the sensor offset compensation circuit 84; output from the sensor offset compensation circuit 84 is supplied to the comparison amplifying circuit 86. An output from the comparison amplifying circuit 86 is delivered to the output circuit 88 and the output signal obtained from the output circuit 88 is used, as a control output, for example, for the control of a drive source of an unillustrated vacuum generating apparatus.

The pressure detection apparatus according to this invention is basically constructed as described above. A description will next be made on its operation and the advantageous effects of the pressure detection apparatus.

The pressurized air introduced from the inlet 20 is brought into the nozzle 24 through the passage 22. The pressurized air is reduced by the orifice 28 defined in the nozzle 24 and led to the needle valve 36 through the passage 34. The needle 44 supplies the reference pressure to the pressure chamber 40 with a valve opening of the needle 44 being adjusted within the gap 43 under the twisting motion of the screw 48. Accordingly, the pressurized air which passes through the first orifice 28 passes through the needle valve 36 and introduced into the pressure chamber 40 as the air including a constant pressure value, thereby to utilize the same as reference pressure.

On the other hand, the pressurized air, which passes through the second orifice 30 defined in the nozzle 24, travels from the passage 32 to the passage 62 and then reaches the semiconductor pressure sensor 60 through an inner passage of the conduit 64. Thus, the semiconductor pressure sensor 60 generates, as an electric signal, the difference between the reference pressure applied to the pressure chamber 40 and measured pressure in the air led to the detection nozzle 67 through the passage 32.

At this time, as shown in FIG. 2, a constant voltage from the constant-voltage circuit 82 is applied to the semiconductor pressure sensor 60. In other words, the difference between the reference pressure in the pressure chamber 40 and measured pressure in the air obtained through the conduit 64 from the passage 62 is introduced into the sensor offset compensation circuit 84 as the sensor output voltage $V_S$ from the semiconductor pressure sensor 60. When a sensor offset voltage $V_S$=OFFSET is obtained from the semiconductor pressure sensor 60, in the case where pressure in the air applied to the semiconductor pressure sensor 60 is substantially zero under a predetermined temperature, the sensor offset compensation circuit 84 serves to reduce it to zero, i.e., to achieve the so-called zero-point temperature compensation function. Thus, a voltage signal corresponding to the difference in pressure is inputted only to the comparison amplifying circuit 86. The comparison amplifying circuit 86 serves to supply an output signal corresponding to the positive or negative polarity of the output voltage from the semiconductor pressure sensor 60 to the output circuit 88, which in turn delivers an on-off control output to the unillustrated vacuum generating apparatus.

According to the present invention, as has been described above, the constant-voltage drive is performed by applying a desired voltage from the constant-voltage circuit to the semiconductor pressure sensor. In addition, the zero-point adjustment of the semiconductor pressure sensor, which is made under the predetermined temperature, compensates for the offset value of the semiconductor pressure sensor. Accordingly, a stable operation can always be obtained. In addition, the difference between the reference and comparison pressure, i.e., the output from the semiconductor pressure sensor can be obtained in a state uninfluenced by variations in external atmospheric temperature. Thus, the present invention can bring about the advantage that the control of each device connected to the pressure detection apparatus can be achieved with extreme ease. It is therefore possible to bring about the practical effect that the construction of the circuit is substantially simplified by using constant-voltage drive rather than constant-current drive, as well as the advantages of ease of use of the apparatus.

Having now fully described the invention, it will be apparent to those skilled in the art that many changes and modifications can be made without departing from the spirit or scope of the invention as set forth herein.

What is claimed is:

1. A pressure detection apparatus, comprising:
   at least one semiconductor pressure sensor interposed between a reference pressure side and a measured pressure side for detecting pressure in a fluid corresponding to the difference between the reference pressure and the measured pressure;
   a constant-voltage drive circuit means for driving said semiconductor pressure sensor at a constant voltage, wherein an output voltage from said constant-voltage drive circuit means is applied to said semiconductor pressure sensor, and
   a sensor offset compensation circuit means connected to an output side of said semiconductor pressure sensor for performing zero-point adjustment of an output value from said semiconductor pressure sensor at a predetermined temperature.

2. A pressure detection apparatus according to claim 1, further including a comparison amplifier means connected to an output side of said sensor offset compensation circuit means for amplifying an output signal assuming the positive or negative polarity from said sensor offset compensation circuit means and an output circuit connected to an output side of said comparison amplifier means and for producing an on or off control output depending on the positive or negative polarity of the output signal from said comparison amplifier means.

3. A pressure detection apparatus according to any one of claims 1 or 3, wherein the pressure fluid is air.

4. A pressure detection apparatus, comprising:
   at least one semiconductor pressure sensor interposed between a reference pressure side and measured pressure side for detecting pressure in a fluid corresponding to the difference between the reference pressure and the measured pressure;
   a constant-voltage drive circuit means for driving said semiconductor pressure sensor at a constant voltage;
   a sensor offset compensation circuit means connected to an output side of said semiconductor pressure sensor for performing zero-point adjustment of an output value from said semiconductor pressure sensor at a predetermined temperature; and
   a comparison amplifier means connected to an output side of said sensor offset compensation circuit means for amplifying an output signal assuming the positive or negative polarity from said sensor offset compensation circuit means and an output circuit connected to an output side of said comparison amplifier means and for producing an on or off control output depending on the positive or negative polarity of the output signal from said comparison amplifier means.

5. A pressure detection apparatus according to claim 4, wherein the pressure fluid is air.

* * * * *